May 26, 1953      H. A. WONS      2,639,840
LIQUID WEIGHING AND DISPENSING VESSEL
Filed April 16, 1949
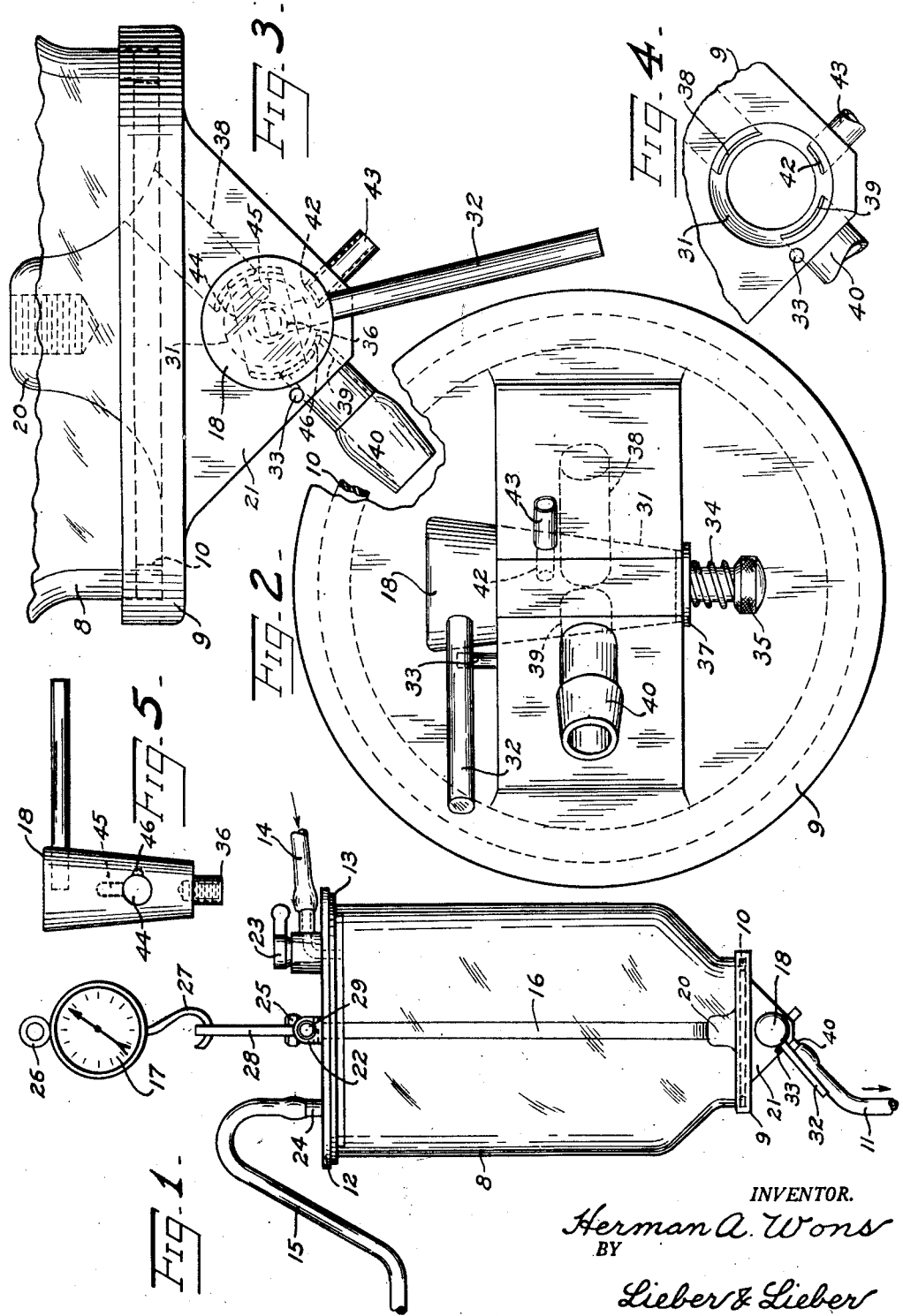
INVENTOR.
Herman A. Wons
BY
Lieber & Lieber
ATTORNEYS.

Patented May 26, 1953

2,639,840

UNITED STATES PATENT OFFICE 2,639,840

LIQUID WEIGHING AND DISPENSING VESSEL

Herman A. Wons, Albert Lea, Minn., assignor to Universal Milking Machine Division, Waukesha, Wis., a division of National Co-Operatives, Inc., a corporation of the District of Columbia Application April 16, 1949, Serial No. 87,887

1 Claim. (Cl. 222—485)

The invention relates generally to improvements in the art of measuring and determining characteristics of liquids, and relates more particularly to improvements in the construction and operation of apparatus for weighing and/or for obtaining test samples of bulk liquids such as milk.

The primary object of my invention is to provide an improved liquid weighing and sampling assemblage which is simple and compact in construction, flexible in its adaptations, and highly efficient in use.

In the dairy industry, it is frequently desirable to weigh the milk being delivered from the animals by the mechanical milking machines, and to also periodically remove test samples of the commodity in order to determine various characteristics of the product. While it has heretofore been common practice to weigh such commodity, this has ordinarily been done by depositing successive batches of the milk in cans or the like while exposed to the ambient atmosphere, and the procedure was therefore relatively unsanitary besides necessitating extra labor in handling the liquid. When the milking machines are operating, it is also preferable to be able to see the condition of the milk being delivered, and to also be able to conveniently remove test samples thereof from time to time from each individual cow or other production source without mixing and before prolonged exposure to the atmosphere, and the prior systems of handling such product have not only been cumbersome and unsystemmatic, but have also failed to incorporate these desirable features.

It is therefore an important object of the present invention to provide an improved system whereby fresh milk being delivered from a source of supply may be accurately weighed in a sanitary manner without necessarily being exposed to the atmosphere, and wherein the condition of the product is constantly visible while test samples thereof are conveniently removable.

Another important object of this invention is to provide a simplified milk weighing and sampling vessel which may be maintained in highly sanitary condition at all times, and which is operable with minimum loss of time.

A further object of the invention is to provide an improved milk weighing assemblage adapted to quickly and accurately weigh successive batches of the liquid while in enclosed transit from the milking machines to the final transporting receptacles.

Still another object of my invention is to provide an improved transparent vessel adapted to be readily installed in the milk delivery lines of standard milking machines so as to provide a visible indication of the condition of the commodity being delivered.

An additional object of my present invention is to provide a milk weighing and sampling unit which may be readily dismantled for cleaning and just as readily reassembled for normal use, and which may also be conveniently installed in a bulk milk conducting or transporting system.

Another object of the present invention is to provide a weighing and sampling device for milk or the like, which comprises relatively few simple but durable parts, and which may be manufactured and sold at moderate cost and manipulated by a novice.

These and other objects and advantages of the invention will be apparent from the following detailed description.

A clear conception of the features constituting the present improvement and of the construction and operation of a typical system embodying the same, may be had by referring to the drawing accompanying and forming a part of this specification wherein like reference characters designate the same or similar parts in the various views.

Fig. 1 is a side elevation of a typical milk weighing and sampling vessel suspended from a weighing scale and showing the same installed in a mechanical milking system and with the milk control valve closed;

Fig. 2 is an enlarged fragmentary bottom view of the vessel of Fig. 1;

Fig. 3 is a similarly enlarged side view of a fragment constituting the lower portion of the vessel, showing the milk control valve partially open;

Fig. 4 is a fragmentary side view of the lower closure head of the vessel with the flow control valve removed from its socket; and Fig. 5 is a top view of the control valve alone.

While the invention has been shown and described as being especially applicable to fresh milk transfer systems associated with vacuum actuated milking machines, it is not my desire or intent to thereby unnecessarily restrict the utility of the improved features; and it is also contemplated that specific descriptive terms used herein be given the broadest interpretation consistent with the disclosure.

Referring to the drawing, the typical improved milk weighing and sampling equipment shown therein by way of illustration, comprises in general a tubular transparent jar or receptacle 8; a lower head or closure 9 having a central upper recess provided with an annular gasket 10 coacting with the lower extremity of the receptacle 8, and also having a flexible milk discharge conduit or line 11 leading therefrom; an upper head or closure 12 having a central lower projection embraced by another annular gasket 13 coacting with the upper extremity of the receptacle 8, and being provided with a flexible milk supply tube or line 14 leading thereto and with a flexible vacuum tube or line 15 leading therefrom; a central tie-rod 16 detachably uniting the closures 9, 12 and clamping the receptacle 8 between the gaskets 10, 13; a weighing device or scale 17 from which the receptacle and closure assemblage is normally suspended; and a milk flow control valve 18 associated with the lower closure head 9.

The tubular casing or receptacle 8 may be formed of any suitable transparent material such as glass, "Pyrex," plastic, or the like, and of any desired capacity; preferably being constricted and abruptly tapered at its lower end as shown, in order to permit ready drainage of its liquid contents. The lower and upper heads or closures 9, 12 may be formed of stainless steel or other rust resistant material which may be readily cleaned; and the lower closure 9 has a central upper projection 20 and a lower depending lug 21 formed integral therewith as shown more in detail in Figs. 2 and 3. The upper closure 12 is provided with integral ears 22 and with a shut-off valve 23 past which the milk supply line 14 is communicable with the interior of the vessel, and also has an air exhaust nipple 24 to which the vacuum line 15 is attachable, see Fig. 1.

The central tie-rod 16 is provided at its lower extremity with screw threads adapted to coact with a threaded socket formed in the central head projection 20, and the rod 16 pierces the upper closure 12 between the ears 22 and is provided with a thumb nut or knob 25 adapted to engage the closure 12 so as to clamp the two closures 9, 10 against the adjacent ends of the receptacle 8 through the resilient sealing gaskets 10, 13. The vessel suspension scale 17 may be of any suitable type adapted to be hung from a fixed beam or the like, by means of an eye 26, and this scale has a hook 27 cooperable with a sling 28 which is swingably attached to the upper closure ears 22 by pivot pins 29, thus permitting the sling to be swung out of the way when the tie-rod 16 is being removed or applied.

The milk flow control valve 18 may be of the tapered plug type and normally coacts with a similarly tapered bore or socket 31 formed in the depending lug 21 of the lower closure head, and the valve 18 is manually manipulable with the aid of a handle 32 which is cooperable with a stop pin 33 secured to the lug 21 when the valve is closed as in Fig. 1. The valve plug is normally retained within the socket 31 by means of a spring 34 one end of which coacts with a cap screw 35 detachably secured to a projection 36 at the smaller end of the valve 18, and the opposite end of which reacts against a washer 37 loosely surrounding the valve projection 36 as illustrated in Fig. 2. The lower closure 9 is provided with a passage 38 connecting the interior of the milk confining vessel with the socket 31, and a diametrically opposite passage 39 connects the socket 31 with the milk discharge line 11 through a hose attaching nipple 40. The socket 31 is also provided with a sample delivery port 42 disposed between the passages 38, 39 as indicated in Fig. 4, and a sampling spout 43 is secured to the lug 21 and is directed downwardly and outwardly away from the port 42.

The tapered body of the valve 18 has a relatively large transverse bore or opening 44 extending diametrically through the center thereof and adapted to connect the passages 38, 39 when the handle 32 is swung to the right and points downwardly at an angle of approximately forty-five degrees; and a relatively deep groove 45 extends longitudinally of the valve body away from the through opening 44 as shown in Figs. 3 and 5. The valve 18 is moreover provided with a venting notch 46 as shown in Fig. 5 for the purpose of admitting air to the opening 44 when a test sample of milk is being discharged from the bore 44 through the spout 43. The hoses or tubular lines 11, 14 and 15 should be formed of relatively flexible material so as not to interfere with accurate recording of the weight of the successive batches of milk confined within the vessel during normal use of the apparatus.

During normal operation of the improved milk weighing and sampling system, the transparent vessel after having been properly constructed and assembled as described, should be connected to the milk supply line 14, to the vacuum line 15, and to the milk discharge line 11, and suspended from the weighing scale 17 as shown in Fig. 1, whereupon the apparatus is ready for use. When starting, the valve 23 should be opened and the flow control valve 18 should be closed by swinging the handle 32 against the stop pin 33; and when the milking machine is operating air will be evacuated from the interior of the receptacle through the vacuum line 15 and milk will flow into the evacuated chamber through the supply line 14. Whenever the receptacle 8 has been approximately filled with a batch of milk, the attendant may momentarily close the valve 23 and accurately determine the weight of the batch by reading the scale 17, after which he may open the control valve 18 by swinging the handle 32 to the right, to permit drainage of the batch from the vessel.

If it is desired to remove a test sample of the milk admitted to the system, this may be done at any time or whenever the valve 18 is returned to closed position by swinging the handle 32 to the right, whereupon the transverse bore 44 of the valve body will be connected with the sampling port 42 by the groove 45, and the milk from within the bore 44 will escape through the spout 43 while air enters the top of the opening 44 through the notch 46. The weight of the successive batches of the product may thus be accurately determined, and samples of the commodity may be removed whenever desired, without exposing the milk to the ambient atmosphere; and when it is desired to operate the system without weighing or sampling the milk, the valves 23, 18 may be left wide open so that the liquid will constantly flow from the supply line 14 through the receptacle 8 and past the open control valve 18 through the discharge line 11.

In order to clean the improved equipment, it is only necessary to shut off the source of milk supply and the vacuum, and to thereafter release the clamping nut 25 from the central tie-rod. This will release the closure heads 9, 12 from the transparent receptacle 8, whereupon the gaskets 10, 13 may be removed and all parts of the vessel may then be thoroughly cleansed. The valve 18 may also be quickly removed from its socket 31 by merely removing the screw 35, spring 34 and washer 37, thus permitting these parts to be maintained in sanitary condition, and reassembly of the entire structure may be just as quickly and conveniently accomplished. This cleansing of the weighing and sampling unit may also be effected without the aid of special tools of any kind, and all of the properly assembled parts are effectively sealed against undesirable entry of air or escape of milk.

From the foregoing detailed description, it will be apparent that my present invention in fact provides a system for accurately weighing successive batches of milk in rapid succession and without exposing the product to the ambient atmosphere or to human touch. The improved system also permits convenient removal of test samples of the liquid commodity at any time without interfering with the weighing operations, or with the flow of liquid through the vessel when no weighing is desirable. The transparent receptacle 8 also enables the operator to see the condition of the milk and to observe the functioning of the apparatus at all times, and the relatively few simple parts involved in the improved structure, and the convenient manner of assembling and dismantling these parts without the aid of tools, makes it possible to maintain the unit in most sanitary condition at all times with minimum effort and loss of time.

The improved devices may be manufactured in various sizes dependent upon the capacities desired, and the volume of the test samples may also be increased or diminished to suit by merely varying the size of the bore 44, and the assemblage may be manipulated by a novice and with minimum effort. Under certain conditions, the discharge line 11 may also be placed under vacuum to quickly and sanitarily convey the batches of milk to other receptacles without being exposed to human hands or to the atmosphere, but the valve 23 should be closed during such operation of the assemblage. The system may also be operated without introducing messy conditions due to undesirable escape of milk, and has proven highly satisfactory and successful in actual use. The improved units may also be produced and sold at moderate cost for operation with standard milking equipment in practically all dairy installations.

It should be understood that it is not desired to limit this invention to the exact details of construction of the apparatus, or to the precise mode of operation of the system, herein specifically shown and described, for various modifications within the scope of the appended claim may occur to persons skilled in the art.

I claim:

A liquid weighing and dispensing vessel comprising, an upright tubular body, upper and lower closures sealingly engaging the respective upper and lower ends of said body, said lower closure being of unitary construction and having an integral central portion projecting upwardly into said body and an integral portion extending downwardly below said body, a tie rod extending through said body along the central axis thereof and secured at one end to the upwardly projecting portion of said lower closure and at the other end to said upper closure to clamp said body therebetween, a liquid inlet conduit communicating with the interior of said body through said upper closure laterally of said tie rod, a flow control valve confined entirely within the downwardly extending portion of said lower closure beneath said tie rod and in axial alinement therewith, a passage in said lower closure extending angularly from said valve to the interior of said body laterally of said tie rod, and a pair of angularly directed discharge conduits connected to the downwardly extending portion of said lower closure and communicating with said passage past said valve, said valve being operable to interchangeably connect said angular passage with either or both of said discharge conduits.

HERMAN A. WONS.

References Cited in the file of this patent

UNITED STATES PATENTS

| Number | Name | Date |
| --- | --- | --- |
| 18,035 | Borrman | Aug. 25, 1857 |
| 400,251 | Reed | Mar. 26, 1889 |
| 879,000 | Ditner | Feb. 11, 1908 |
| 1,201,819 | Hald | Oct. 17, 1916 |
| 1,205,986 | Gipe et al. | Nov. 28, 1916 |
| 1,256,184 | Tolman | Feb. 12, 1918 |
| 1,260,262 | Hills | Mar. 19, 1918 |
| 1,414,777 | Else | May 2, 1922 |
| 1,562,121 | Newton | Nov. 17, 1925 |
| 1,705,105 | Armistead | Mar. 12, 1929 |
| 1,873,010 | Mitton | Aug. 23, 1932 |
| 1,961,331 | Bovard | June 5, 1934 |
| 2,321,175 | Binckley | June 8, 1943 |
| 2,434,723 | Shook | Jan. 20, 1948 |
| 2,435,578 | Ferrez, Jr. | Feb. 10, 1948 |
| 2,450,715 | Campbell | Oct. 5, 1948 |

FOREIGN PATENTS

| Number | Country | Date |
| --- | --- | --- |
| 323,569 | Germany | Aug. 2, 1902 |